July 30, 1968  TAKEHIKO KIMURA  3,394,604

SPEED CHANGE GEAR MECHANISM FOR BICYCLE

Filed Dec. 7, 1966

Takehiko Kimura,
Inventor

By, Wenderoth, Lind & Ponack.
Attorneys

United States Patent Office 3,394,604
Patented July 30, 1968

3,394,604
SPEED CHANGE GEAR MECHANISM
FOR BICYCLE
Takehiko Kimura, Kaizuka, Osaka, Japan, assignor to
Shimano Kogyo Kabushiki Kaisha, Oimatsu-cho, Sakai,
Japan
Filed Dec. 7, 1966, Ser. No. 599,890
Claims priority, application Japan, Dec. 15, 1965
(utility model), 40/102,044
1 Claim. (Cl. 74—217)

ABSTRACT OF THE DISCLOSURE

This invention relates to a speed change gear mechanism for a bicycle, in which a free wheel assembly on one end of the rear axle of the bicycle is provided with a plurality of sprocket wheels of different number of gear teeth, which is associated with a shifting device comprising a frame adapted for parallelogrammic motion for shifting the endless drive chain from one of the sprocket wheels to the other, and there is provided a control mechanism actuatable through a Bowden wire and arranged on a handle bar of the bicycle and adapted to selectively actuate said shifting device on the rear axle of the bicycle.

---

The present invention is an improvement of the speed change gear mechanism forming the subject matter of the co-pending application Ser. No. 537,343, filed Mar. 25, 1966, now Patent No. 3,362,238.

The principal object of the present invention is to provide an improved mechanism which is of more compact and simpler construction in contradistinction to the mechanism of the above mentioned co-pending application.

In the accompanying drawing, in which a preferred form of the embodiment of the present invention is illustrated:

Figure 1:
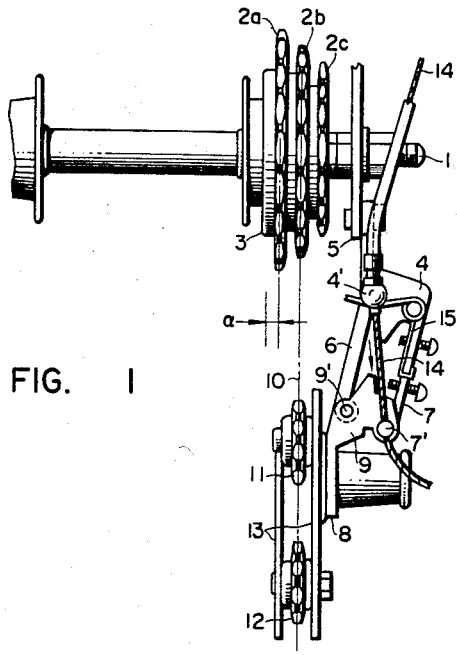
FIGURE 1 is a rear view of the outside arranged speed change gear mechanism for a bicycle to be associated with a change lever mechanism according to the present invention.

Referring to FIGURE 1, the reference numeral 1 designates a rear wheel axle of a bicycle, on which at the righthand end portion there is mounted a free wheel assembly 3 comprising three chain or sprocket wheels 2a, 2b and 2c each having a different number of gear teeth, the outermost sprocket wheel 2c having the smallest number of gear teeth. Adjacent said outermost sprocket wheel 2c, there is securely mounted a bracket 5 carrying a support plate 4 on which there are pivoted an inner link 6 and an outer link 7. At the other ends, said links 6 and 7 are pivoted to a rocker arm 9 having an extension 8. The support plate 4, the inner and outer links 6, 7 and the rocker arm plate 9 are so arranged that they constitute a frame adapted for parallelogrammic motion. Secured to said rocker arm extension 8, there are change-over bearing plates 13 carrying a guide sprocket wheel 11 and a tension spocket wheel 12 for an endless drive chain 10. An actuating Bowden wire 14 is passed through the pivot point 4' between the inner link 6 and the support plate 4 and, at its free end, it is securely connected to the pivot point 7' between the outer link 7 and the rocker arm plate 9 as shown. 15 is a spring connected to the outer link 7 and having a tendency to maintain the distance between the pivotal points 4' and 7' elongated so that the Bowden wire 14 is pulled in the direction of arrow and the rocker arm 9 is oscillated clockwise around the pivot 9'.

Figure 2:
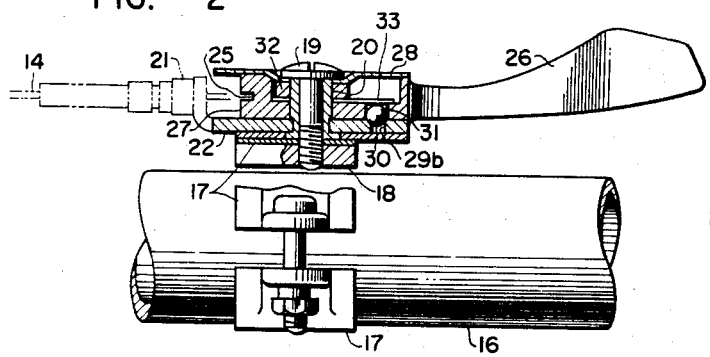
FIGURE 2 is a side view partly in section of the change gear mechanism on a handle bar of a bicycle according to the present invention.
Figure 3:
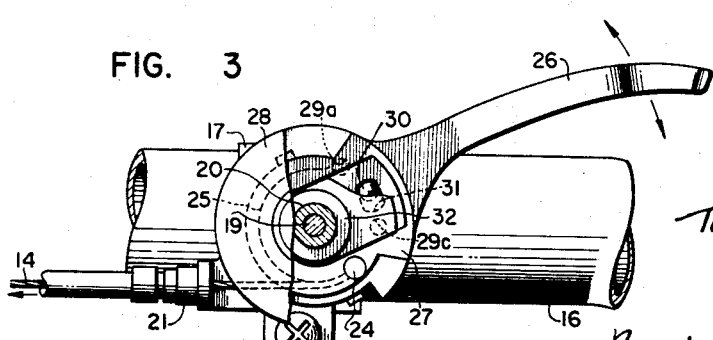
FIGURE 3 is a front view of said change lever mechanism.
Figure 4:
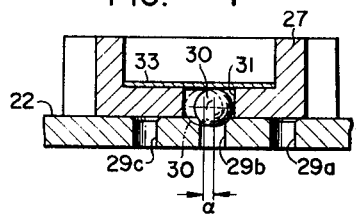
FIGURE 4 is an enlarged sectional detail view of a part of the change lever mechanism.

Referring to FIGURES 2 to 4, a switching-over handle device actuatable by means of a hand lever 26 is provided on a handle bar 16 of a bicycle. A clamp 17 on the handle bar has a nut 18, to which a sleeve 20 having a control plate 22 securely fitted therewith is mounted by means of a screw bolt 19. Said control plate 22 has a sheath 21 through which the Bowden wire 14 is passed. A winding drum 27 having a cap 28 is rotatably mounted on the sleeve 20. This drum is provided with an annular groove 25, around which the Bowden wire 14 is passed and its inner end is secured to the winding drum at 24. The hand lever 26 is fixed to or integral with the winding drum 27. Said control plate 22 is provided with a plurality of circular holes, the number of which holes corresponding to the number of the above mentioned sprocket wheels 2a, 2b and 2c on the rear axle of the bicycle. In the example shown, there are three circular holes 29a, 29b and 29c arranged in an arc of a circle having its center concentric with respect to the center of rotation of the winding drum 27. The winding drum 27 is slidable relative to the control plate 22. In said winding drum 27, in the position adjacent said circular holes 29a, 29b and 29c, there is a reception hole 31 which is larger than the circular hole in the control plate 22, which larger hole 31 contains therein a clip-stop ball 30. Said clip-stop ball 30 is free to be moved in the larger hole 31 and is adapted to be partially dropped into the mouth of selected one of said three circular holes, being pressed by means of a leaf spring 33 held by a presser ring 32.

Figure 5A:
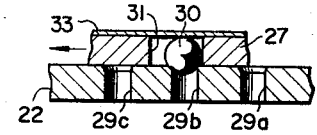
FIGURES 5a to 5d are sectional views substantially similar to FIGURE 4, showing the manner of switching-over operation of the change lever mechanism.
Figure 5B:
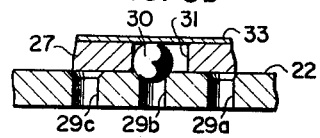

As mentioned above with reference to FIGURE 1, the Bowden wire 14 is normally pulled in the direction of the arrow by the action of the spring 15. With the hand lever 26 held in the position shown in FIGURE 3, it is to be noted that the winding drum 27 is in the position, where the clip-stop ball 30 is partially dropped into the middle circular hole 29b as shown in FIGURES 4 and 5a, and the clip-stop ball 30 is held abutting against one side wall of the larger hole 31. This position is for the normal speed drive.

Figure 5C:
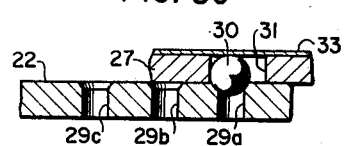
Figure 5D:
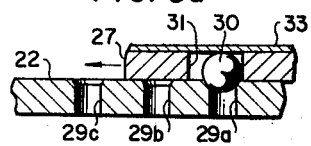

Now, when the hand lever 16 is manually turned upwardly in FIGURE 3 against the action of the spring 15, the winding drum 27 will be moved in the direction reverse to the direction of arrow with no effect upon the clip-stop ball 30 for the distance of α (FIGURE 4). Upon continued turning of the hand lever 26, the clip-stop ball 30 will be rolled out of the circular hole 29b and transferred into the mouth of the adjacent circular hole 29a (FIGURE 5c). When the hand pressure on the lever 26 is released, the winding drum 27 will slightly return in the direction of arrow by the action of the spring 15 and the motion of the winding drum relative to the control plate 22 will be stopped (FIGURE 5c). This is the position for the low speed drive, and this position is maintained even if the hand pressure on the lever 26 is released, due to the fact that the clip-stop ball 30 is retained in the mouth of the circular hole 29a by the pressure of the leaf spring 33. It will be seen, according to the above mentioned manipulation of the hand lever 26, that when the Bowden wire 14 is pulled against the direction of arrow to turn the rocker arm 9 in a counterclockwise direction in FIGURE 1, thereby the guide and tension sprocket wheels 11 and 12 are shifted outwardly and the drive chain 10 is shifted to the low speed drive sprocket wheel 2c.

From the foregoing it will be understood that, according to the improved arrangement of the present invention, there is provided the leaf spring 33 for normally holding the clip-stop ball 30 in engagement with the mouth of the small control hole 29a or 29b or 29c in the control plate 22, and consequently that the change-over mechanism on the handle bar of the bicycle may be designed so as to be considerably simpler and compact.

What I claim is:

1. In conjunction with a speed change gear mechanism having a free wheel assembly mounted on one end of the rear wheel axle of a bicycle and comprising a plurality of sprocket wheels each having a different number of gear teeth and having a chain shifting device having a sprocket wheel support frame adapted for parallelogrammic motion and adapted to be actuated by means of a Bowden wire normally pulled in one direction by means of a spring, a control device mounted on the handle bar of the bicycle and comprising a winding drum rotatably mounted on said handle bar and having a hand lever secured thereto or integral therewith, one end of said Bowden wire being securely connected to said winding drum, and said winding drum being provided with a large reception hole containing a clip-stop ball, an immovable control plate slidable relative to said winding drum and having a plurality of small circular holes, the diameter of which are smaller than that of said clip-stop ball, and a leaf spring adapted for normally pressing said clip-stop ball against the said control plate.

References Cited

UNITED STATES PATENTS

| | | | |
|---|---|---|---|
| 1,368,095 | 2/1921 | Balch | 74—528 XR |
| 1,498,859 | 6/1924 | Wekerle. | |
| 2,428,166 | 9/1947 | Letourneur | 74—217 |
| 2,431,513 | 11/1947 | Schwinn | 74—217 |

FRED C. MATTERN, Jr., *Primary Examiner.*

J. A. WONG, *Assistant Examiner.*